United States Patent [19]

Schumacher

[11] 4,315,282
[45] Feb. 9, 1982

[54] WRITE AND EDIT CIRCUITRY FOR ELECTRONIC MARKING OF DISPLAYED TV SIGNAL IMAGES

[75] Inventor: Peter M. Schumacher, Great Falls, Mont.

[73] Assignee: Electronic Devices Incorporated, Mont.

[21] Appl. No.: 186,392

[22] Filed: Sep. 11, 1980

[51] Int. Cl.³ ............................................... H04N 7/18
[52] U.S. Cl. ..................................... 358/107; 358/93; 358/183; 340/707
[58] Field of Search .......................... 358/107, 93, 183; 340/707

[56] References Cited

U.S. PATENT DOCUMENTS

3,997,891 12/1976 Iwamura .............................. 340/707
4,017,680 4/1977 Anderson ............................ 340/707
4,115,804 9/1978 Morton ............................... 358/107

*Primary Examiner*—Howard Britton
*Attorney, Agent, or Firm*—Dorsey, Windhorst, Hannaford, Whitney & Halladay

[57] ABSTRACT

A new, revolutionary approach to image processing is disclosed. Using simple logic circuit elements a real time same scan video marking circuit is disclosed which is adaptable to a variety of purposes. The invention can be advantageously used as part of an integrated photogrammetric video measurement system. Using such a system, areas or distances or other graphically detectable characteristics can be displayed on a color television set for purposes of analysis and measurement. Moving pictures, made at ground locations or from an aircraft and collected in television form on a video cassette recorder, can be displayed on the television monitor and measurements of area or of distance made electronically. For the study and analysis of hard copy images, i.e. still photographs, aerial maps, x-rays and the like, an auxiliary system camera can be used which projects the picture onto the television monitor. Gray levels of the display can be detected and electronically marked for such purposes as crop measurement, infestation, weather damage, saline seep studies and the like, or, using other features of the invention, which includes a digital bit plane overlay, specific areas of the analog video display can be electronically marked on the monitor with a light pen, light pencil or cursor controls and, after visual analysis, electronically entered into calculating electronics for purposes of electronic analysis of area or distance measurements, density, heat characteristics, and the like.

34 Claims, 4 Drawing Figures

WRITE AND EDIT CIRCUITRY FOR ELECTRONIC MARKING OF DISPLAYED TV SIGNAL IMAGES

BACKGROUND OF THE INVENTION

An essential task which must be performed to obtain accurate measurements from displayed video images is the delineation of distances or areas to be measured. This task requires a determination of what portion of a delineated area is to be measured, calibration and indications for the measurements, the ability to accurately mark or draw what is to be measured on the screen and the ability to correct or "erase" all or portions of what has been drawn to correct mistakes, to calculate new parameters, or to make different measurements. For area measurements, this process is performed by physically indicating on the CRT screen the boundaries or outline of the area or areas to be circumscribed or filled in and measured. A critical factor in obtaining such measurements from television images is the speed and accuracy with which the operator can make the outline entry.

A user of such a system uses whatever implements are associated with the device which is to perform the actual calculation in the electronic apparatus. The conventional implement currently and conventionally in use is a light pen. Conventional light pen circuitry does not permit free hand drawing of the area. Points or "hits" are indicated on the screen and associated software translates the points into straight lines from point to point, or, based on the point indications, "draws" more sophisticated geometric shapes. Non-linear, or non-geometric, shapes are frequent in video displays of naturally occurring phenomena and, consequently, the conventional light pen requires a multiple number of accurately placed pen "hits" to create a linear or geometric approximation of the desired shape or area.

A first major drawback in the use of conventional light pens is the inherent characteristic which causes an interrupt signal to be generated for several electronic locations surrounding the actual pen tip. Another major drawback is in the propagation delay which causes the electronic position of the raw pen interrupt to appear to the right of the pen tip's physical location when positioned on a raster scanning monitor. Consequently, with conventional light pen circuits there is a need for software or hardware circuitry commonly associated with light pen interrupt processors. They function to enter the first interrupt into an address or other cell position indicator memory and, through a program of hardware or software control, decrement that location to a location more closely related to the physical position of the pen tip on the monitor. This is conventionally done with hardware or software which creates a subliminal blinking operation, detectable by the pen tip, to appropriately position the data point with the pen tip. When correctly located the location is then latched for subsequent entry into the video display memory device. After each point is accurately located, additional hardware and software is necessary to connect the points and process which type of of measurement is desired.

The remaining difficulty in determining area measurements is in transferring or translating the measurement and control of measurement and the record of the measured area location into a computer for further processing and storage, which conventionally requires even more processing hardware and software.

Such hardware and software is extremely expensive and is of limited flexibility in achieving an accurate and rapid drawing or marking function on a video display.

SUMMARY OF THE INVENTION

Using inexpensive logic circuit elements, the write and edit circuitry of the present invention allows coincident real time entry of data on a video display. The invention is achieved by creating a digital single bit plane overlay over an analog video display. The analog video display can be obtained from a video cassette recorder or a video camera or both, all of which, including the bit plane, are synchronized by the same horizontal and vertical sync pulses.

Greatly increased flexibility is achieved by a plurality of input devices which accurately "draw" electronically, lines or areas on the CRT screen. The input drawing implements include a light pen, a cursor, and a new device called a "light pencil".

The light pencil resembles an ordinary pencil, having one or more bright surfaces such as a small lamp or white paint. The light pencil may have one or more lamps which can vary in size, depending upon the desired width of the line to be drawn with the pencil onto the television image. The light pencil's function allows signal pick up by a remote television camera. The camera signal is then processed to detect the electronic location in the camera scan of the pencil's bright surface. As the detected signal is in synchronization with other system signals, including the single bit plane memory, the electronic position of the pencil can be transferred into the bit plane and located in memory as it is positioned by the operator wherever and however it is moved by the operator. The bit plane memory output is overlaid onto the image being viewed on the television monitor for the system.

A switch allows the user to control the entry of the pencil position into the bit plane memory. The pencil interrupt signal is displayed on the TV monitor prior to entry control, thus allowing the user to view the position of the pencil on the monitor display and to move the pencil to the desired location to begin the outline without making entries into the bit plane memory. This is a very unique approach to entering image outlines in that the user simply manipulates the pencil within the viewing area of a television camera focused on the surface of movement of the pencil.

Simultaneous viewing of a synchronized second video input such as from a video cassette recorder is also possible. Any information viewed on the screen from the second video source can be marked using the light pencil and the first video source. Thus, overlaying the second video transmission with the transcription is possible.

By using a light pen, entries into the bit plane can be made directly from the television monitor screen surface. Using the invention, the light pen interrupt can be limited to a single pulse of any desired width, and it can be positioned to coordinate exactly with the pen tip. This is accomplished through the use of two or more one-shot multivibrators.

The first multivibrator in the circuit will retrigger on receipt of each raw interrupt generated by the pen. As the pen will issue many interrupts in the electrical area surrounding the tip of the pen, this circuit inhibits the recognition of all interrupts, following the first interrupt, issued by the pen as the delay of the multivibrator is set to be longer than the time required to scan one Raster line in a Raster monitor. Connected to the first multivibrator is a second multivibrator, which triggers on the leading edge of the signal issued by the first multivibrator. By adjusting the time of the second multivibrator to delay the output or trailing edge of the second multivibrator to a time equal to the period of Raster line scanning, minus the propagation delay times of the light pen raw interrupt and the first multivibrator, the leading edge of the second multivibrator signal can be calibrated to be positioned directly under the light pen tip. This is on the second line within the sensed area of the light pen. The leading edge of the second multivibrator may be detected by the associated equipment for which the pen interrupt was generated. If a pulse representing the light pen interrupt is required, in place of an edge signal, a third multivibrator can be triggered on the leading edge of the second multivibrator, and any time constant can be selected to produce an output pulse as desired from the third multivibrator, normally to produce a mark of one picture element, or "pixel" on the CRT display.

Conventional cursor circuitry can also be employed to electroncially mark the screen as the signals are created. As the coordinate positions of the cursor are determined they can be connected as part of the write and edit circuitry of the present invention to provide a detectable interrupt on the screen and be entered by selected function into the bit plane memory to be graphically displayed on the monitor and subsequently entered into the calculating electronics.

As with the other writing implements, the cursor controls may be employed to allow positioning of the cursor so as to guide the cursor around the perimeter of the area to be measured or to indicate calibrated distances or distances to be measured.

Control circuitry determines the polarity of the bit to be stored in the digital bit plane memory for display. The operator may select a format which allows the interrupt, generated by the previously described methods, to load a one logic level (indicating presence in memory), or to load a zero logic level (indicating the removal or "erasure" of a one in memory) at the position of the interrupt. In other words, the operator may write or erase the overlay from the bit plane memory by using any of the interrupts described.

By using another functional feature of the invention, the operator may cause a line to appear or disappear to the right of the interrupt location. This is accomplished by operator selection of a function called Line Write or Line Edit. (Edit is synonymous with erase and write is synonymous with draw or enter.) By positioning the interrupt to the left of the area to be outlined and measured, while in the Line Write mode, the operator will overlay, on a line by line basis, all points in the image to the right of the interrupt location. The circuitry causes a one logic level to be loaded into memory for all bit plane locations to the right of the interrupt, until the memory bit plane is filled to all locations to the right for each Raster line of memory. At the end of each Raster line of memory, the control circuitry is reset to normal playback of memory locations. Upon the next interrupt, (for example, in the next line) the process of loading logic level one into memory for the next line is repeated and at the end of the line, the mode is again reset to simply playback the bit plane. The scene viewed on the monitor now appears with an overlay beginning at the left perimeter of the area to be measured and extending to the right edge of the image.

By operator selection of the Line Edit mode, and positioning of the interrupt along the right perimeter of the area to be measured, the overlay can, in effect, be sheared off at the right perimeter. The invention in the Line Edit mode function is to load zero logic levels into the bit plane at all memory locations to the right of the interrupt location. The circuitry causes logic level zero to replace the logic level one previously entered by the write modes of the system for any line on which an interrupt is located, until the end of that line of memory. At the end of the memory line, the circuitry is again reset to the normal playback mode of the bit plane memory until the next interrupt is seen by the control circuitry, at which time the process of loading zeros to the right of the interrupt is repeated.

Other interrupts may be used to control the entry of data into the bit plane memory, such as gray level or voltage detection of the input signals. This is possible because the bit plane is controlled solely by the presence of an interrupt at any synchronous location in the bit plane.

Once outlined and overlaid, any common means of calculation of an area for either direct readout in square units, or readout in percentage of total, or readout of further processed mathematical relationships of the area displayed can be performed through the use of common calculator functions which determine the relationship between the number of cells loaded with logic level one and the calibrated area represented by those cells. Calibration of the cell size is performed by using known distance or area information, and a computation of cell count versus that known area or distance. Once the count has been entered for any number of cells, and its relationship to the known area or distance, a per-cell average distance or area constant is then loaded into the electronic calculator memory. The area measurement of the known area, or any area to be determined or other selected physical characteristic derivable from the display can also be displayed after computation on a normal calculator readout.

DESCRIPTION OF THE DRAWINGS

FIG. 2, comprising

DESCRIPTION OF THE PREFERRED EMBODIMENT

As explained above, a preferred embodiment of the write and edit circuitry for electronic marking of TV signals or other displayed images is used with an electronic planimeter system including a Linear Measuring Set 10 manufactured by Electronic Devices Incorporated which is used to make area, distance and other measurements from television displays. It should be understood, however, that the invention has wide and varied application in any apparatus wherein the electronic marking of a Cathode Ray Tube (CRT) display 11 is necessary or desirable.

Figure 1:
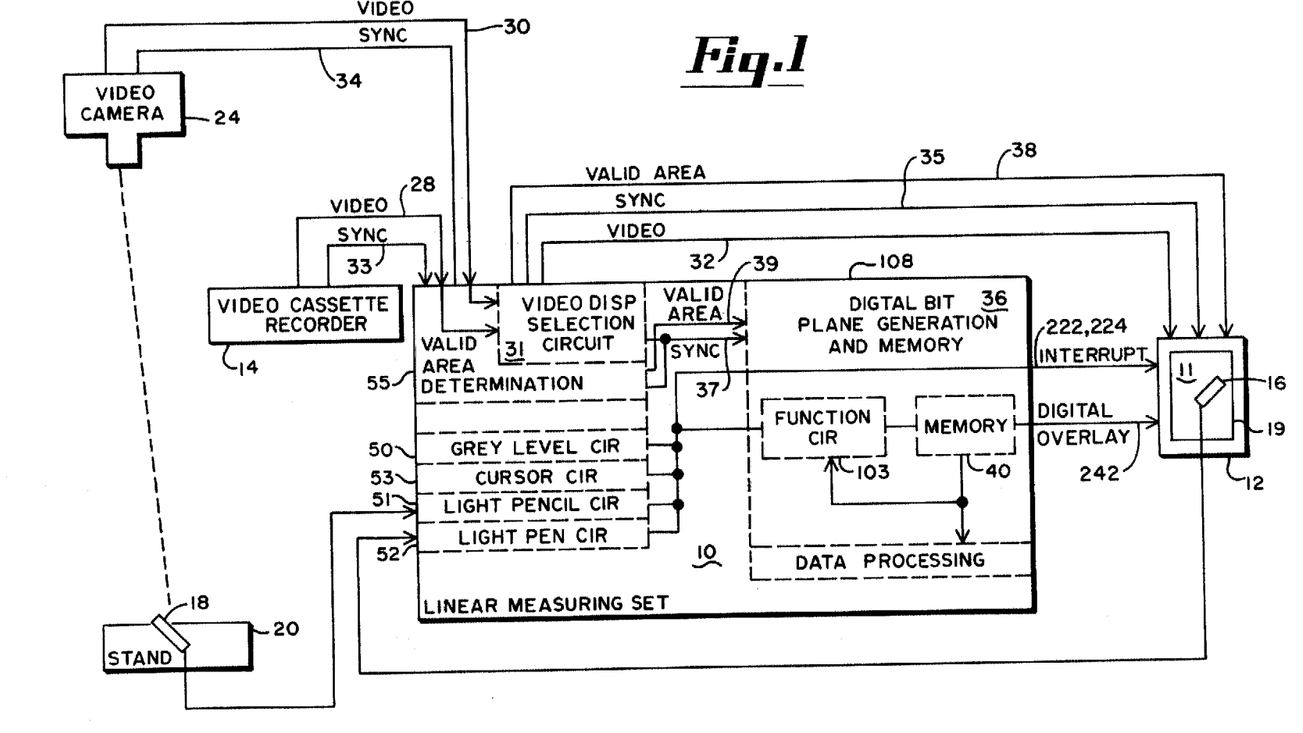
FIG. 1 shows in block diagram form the major components of the system with which the invention is practiced and two of the "writing" elements used to practice the invention, specifically the light pen and the light pencil.

The basic system in connection with which the invention is disclosed is shown in FIG. 1. Using a color TV monitor 12, any displayable images obtained previously with a video camera can be displayed with the use of a video cassette recorder 14. Using the electronic planimeter feature of the system, any one of a plurality of gray levels can be displayed in color to show and determine various characteristics of the scene that is displayed. For example for photogrammetric analysis, cultivated areas, forest areas, infestations, flooding, and the like can be detected and displayed. Using handheld electronic markers, the light pen 16 and light pencil 18, which are elements of the present invention, specific areas, distances or characteristics can be marked on the screen 19 and entered into the Linear Measuring Set 10 for calculation.

Alternatively, or simultaneously, still photographs or the like can be placed on a display table 20. With a video camera 24 on a suitable support (not shown) the photographs can be displayed on the monitor 12. A known area or distance standard may be obtained through the video camera 24, entered into the Linear Measuring Set 10 and thereafter used as a standard of calculation or calibration for any area or measurement obtained from marking the CRT display 11 obtained from the video cassette 14.

Using the present invention marking of the display 11 in color on a real time, same scan, coincident basis is achieved. The marking of the display 11 is not achieved by altering the analog video input signal. Rather, a digital bit plane overlay is generated and synchronized with the analog video signal and both signals are displayed on and confined to the most linear portions of the screen 19 with valid area determination circuitry 55 to achieve the objectives of the invention.

In essence, then, a black and white analog video signal is displayed on the TV monitor 12. The operator of the system can then mark the video display 11 in color by detecting grey levels or with the use of the light pencil 18, a light pen 16, or cursor controls (not shown).

Using the light pencil 18, bright areas, which can be LEDs, 30, 31, are detected by the video camera 24. This video input from the light pencil 18 is then cycled into a memory device 40 and displayed in color as part of the digital bit plane which overlays the video display 11. Similarly, the light pen 16, when it is enabled, detects and displays, one horizontal scan line later, the specific area of the video display 11 which is to be marked in color as part of the overlay. Cursor controls, if used, can generate address locations into the memory 40 at the same time that the information is entered into the video display 11 so that the entries into memory 40 take place at the same time that the cursor is being displayed on the monitor 12.

The real time coincident marking of the video display 11 is achieved as follows.

The video cassette recorder 14 is connected to the color TV monitor 12 through the Linear Measuring Set 10 which contains the grey level detection, light pencil, light pen and cursor circuitry, 50, 51, 52 and 53, respectively. The horizontal and vertical sync signals of the video cassette recorder 14 can be used to synchronize all elements 10, 12, 14, 24 and 40, of the system so that all elements are synchronized one with the other. So that each video display 11, from the video cassette recorder 14, from the video camera 24, and the digital bit plane are on the most linear portion of the screen and are displayed simultaneously a valid area determination circuit 55 is used to define the digital bit plane overlay and also is used to precisely limit the video portions of the display 11.

The valid area determination circuit 55, the output from which is used to define by address or cell location the digital bit plane overlay, divides each horizontal line into two hundred and fifty-six segments and, to maintain a three to four aspect ratio, permits one hundred ninety-two lines to be displayed. A modified vertical sync circuit (not shown) receives the vertical sync signal from the video cassette recorder 14. The sync pulse used for vertical retrace is extended with a one-shot multivibrator to form an extended blanking pulse. The one-shot can be adjusted to vertically center the display and to position the top of the video display 11 on a linear portion of the screen 19.

Similarly, when horizontal sync pulses are received the horizontal retrace sync pulse is extended to form the horizontal blanking pulse with a modified horizontal sync circuit (not shown) which comprises a left edge one-shot multivibrator, to laterally center the display and to position the left edge of the display 11 on a linear portion of the screen 19.

When the top edge one-shot multivibrator times out the next horizontal scan becomes the first line of the display 11. Using a clock signal and a counter circuit (not shown) each horizontal line is divided into two hundred fifty-six segments. The horizontal scan circuitry is connected to a vertical scan counter (not shown) which counts each horizontal line. After one hundred ninety-two lines have been displayed the display again receives the blanking pulse so that each frame is precisely positioned to have one hundred ninety-two horizontal lines all on the linear portion of the CRT screen 19, each horizontal line being divided into two hundred fifty-six segments, or picture elements, also referred to as "pixels". Consequently, if the scale of a given video image 11 is such that the area shown on the screen 19 is a one acre field, the smallest measurable element, pixel, in the image 11 will be 1/49,000 acre.

The memory device 40, which can be of any suitable design, contains a cell location for each picture element or pixel, has a controlled buffered output, and it is from the memory device 40 that the digital bit plane overlay is created.

Therefore, as shown in FIG. 1, two forms of signals are connected and displayed in synchronization by the monitor 12, analog and digital signals. The analog video input signals are obtained from the video cassette recorder 14 and video camera 24. Both signals are connected along lines 28 and 30 respectively to a video display selection circuit 31 which functions to display either one or both signals on the monitor or to alternate the signals at a selected frequency. The output of the video selection circuit 28 is connected as an input to the monitor 12 along line 32.

Synchronization of the signals displayed is achieved by using one primary set of sync pulses, as shown, those emanating from the video cassette recorder 14. The sync signal is therefore shown as an input to the LMS 10 on line 33 and as an output to the video camera on line 34, to monitor on line 35 and to the digital bit plane generation circuit 36 on line 37. The valid area determination circuit 55 which provides the extended blanking pulses to limit the area of the video display and to create the count for the digital bit plane is connected to the circuits 12, 36 which perform those functions along lines 38 and 39 respectively.

Referring now to FIG. 2, the specific circuit elements that make up the write and edit circuitry for electronically marking of TV displays 11 can be discussed and understood. Various embodiments of write and edit circuitry are disclosed, including a light pen 16 and a light pencil 18.

Conventional light pens get a light "hit" from the surface of a CRT display, but the address of the hit which is latched in the light pen circuitry is later in time than the actual location of the hit, the delay being attributable to the propagation time of the light pen circuitry. Thereafter, with hardware or software routines the hit address is decremented with the use of subliminal blinking on a macroscopic and then microscopic basis unit the light pen detects the blinking pixel so that the light pen and surface area of the CRT screen can be precisely aligned. By the time this routine or method has been completed one or more scans have taken place and normally, after the correction address has been located, that address is entered into the memory of the display and is not actually displayed until the following scan.

Using the present invention a light pen 16 hit is displayed during the same scan field that it is detected. This is achieved as follows.

Figure 2A:
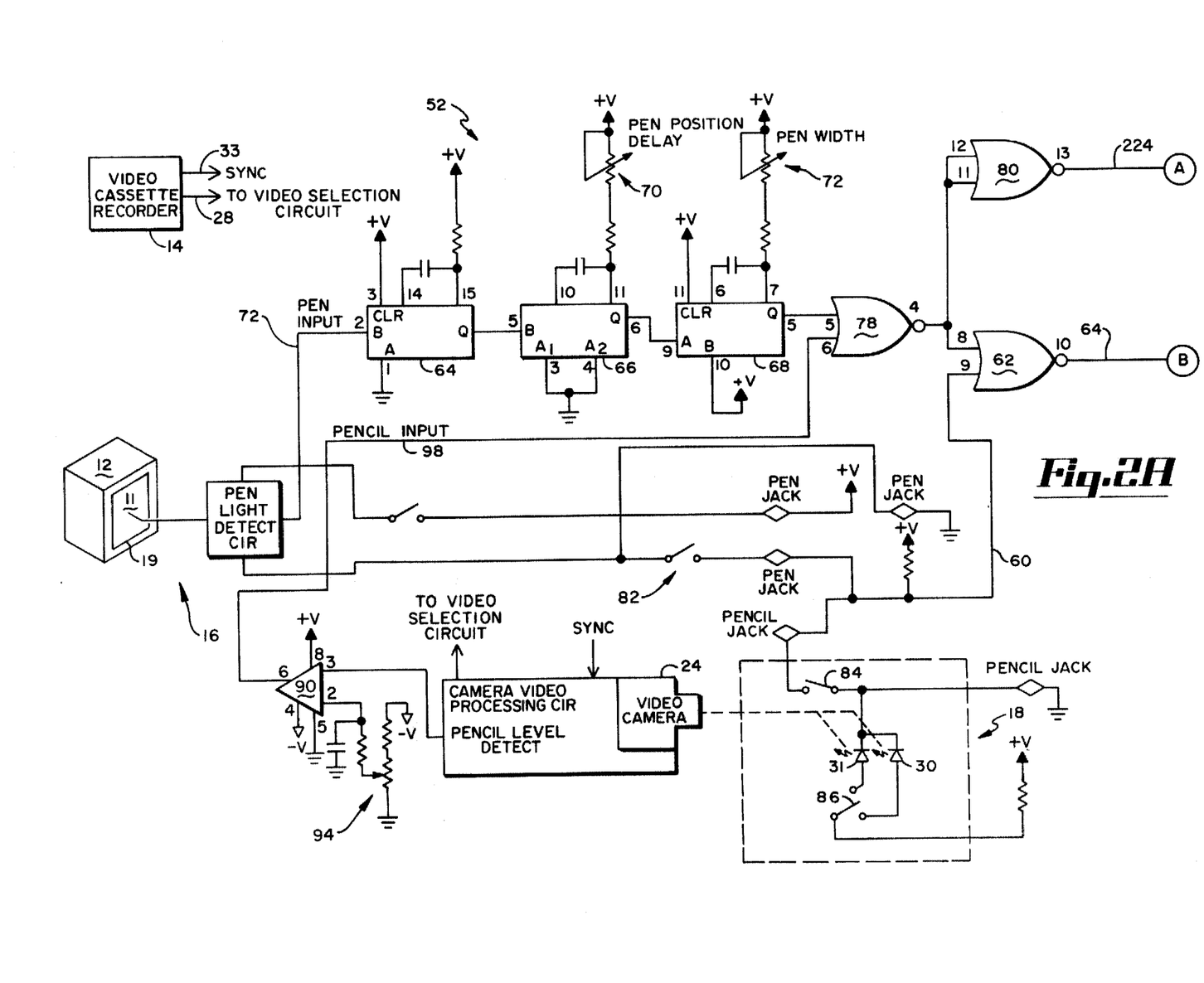
FIGS. 2a, 2b, and 2c, shows partially in block diagram form and partially in schematic the principal elements of the invention and how they interconnect and interrelate to the overall system with which the invention can be practiced.

As shown in FIG. 2a, when the light pen 16 is to be used the light pen 16 is positioned at the monitor 12 to receive a light hit from the display 11. Since there are over forty-nine thousand pixel locations and the light pen, light detection device is not nearly that small a normal hit might cover a number of lines and a number of pixel elements. The present invention accepts the first raw hit and with a series of three multivibrators 64, 66, and 68 positions that hit at the pixel element on the next horizontal scan line immediately below the position that the first hit was received.

Referring to FIG. 2a, the light pen 16 is connected by line 72 to a first one-shot multivibrator 64 adjusted to have a nominal time delay of five hundred microseconds. This is an inhibit so that no additional input hits will be received or accepted for approximately ten lines. The second multivibrator 66 is nominally set for about sixty-three microseconds to delay one horizontal scan line less the propagation time of the light pen detection circuitry 52. An adjustable resistor 70 enables adjustment for variations in light pen detection circuits 52. The third multivibrator 68, nominally set for one hundred fifty to one hundred seventy-five nanoseconds, adjusts the pulse width so that it is preferably one cell or one pixel wide, although it can be expanded if desired with an adjustable resistor 72 provided for that purpose. The light hit is then immediately displayed and can be entered into the graphics memory 40 in the following manner.

The output of the third multivibrator 68 is connected to a first NOR gate 78 which accepts an input from either the pen 16 of the pencil 18, the output of which is connected to a pair of NOR gates 62, 80. The output of one of the NOR gate 80 is connected as an interrupt to the video display circuitry (shown in FIG. 2c) of the monitor 12 to immediately display the location of the pen or pencil in red.

The output of the other NOR gate 62 is connected to enter the signal into the graphics memory 40 in accordance with a selected function. If the logic level signal output of gate 78 is to be entered into the memory 40, and consequently be displayed as part of the digital bit plane overlay, light pen enable switch 82 is closed creating a low signal on pin 9 of NOR gate 62 so that the light pen 16 input signal, on pin 8, is passed through the function circuitry shown in FIG. 2b to the graphics memory 40.

A second handheld external writing implement 18 also forms an important element of the invention. It is referred to as a "light pencil" 18 and consists of a pencil-shaped implement which can be positioned below the video camera 24 to electronically mark the CRT display 11 in a manner similar to the light pen 16. As shown in FIG. 1, the implement 18 resembles in shape a pen or pencil. As shown in FIG. 2a, the light pencil 18 has two operable switches 84, 86. The first switch 84 selects a small LED 30 or large LED 31 to determine the number of pixels that will be marked across the screen 19.

The light pencil 18 is positioned below the video camera 24 so that the camera 24 detects the brightness of the light pencil 18 during the normal video scan of the camera 24. The camera 24 output is connected to a comparator 90 the other input to which, on pin 2, includes a variable potentiometer 94 so that sensitivity of the pencil input can be controlled. Because of this arrangement, alternative marking implements can be used through the light pencil input circuitry, 51, the limiting requirements being that the input must be the brightest area under the video camera 24. Accordingly, a shiny piece of metal (not shown) can be used as the light pencil input. A white piece of paper (not shown) on a dark background can similarly be used and detected through the light pencil circuitry 59 so that the piece of paper can be used in the manner of a block eraser or a broad brush for the graphics displayed on the screen 19.

The light pencil 18 input is connected to the display circuitry in the same manner as the light pen 16 input. The output of the comparator is connected along line 98 to NOR gate 78, the output of which, as discussed above, is connected through NOR gate 80 to act as an interrupt on the CRT display 11 so that the precise position of the light pencil 18 relative to the display 11 can be aligned. The signal is also connected to NOR gate 62, the output of which is connected through function circuitry 103, shown in more detail in FIG. 2b to be discussed below, to the graphics memory 40. To enable NOR gate 62 to pass the pencil input signal a light pencil enable switch 86 is provided as part of the light pencil to create a low enable signal on pin 9 of NOR gate 62.

As discussed above, a digital single bit plane overlay of the analog video signal is created with conventional circuitry 108 from the output of the valid area determination circuitry 55 so that each of the one hundred ninety-two lines of video that are displayed are divided into two hundred fifty-six picture elements. The digital bit plane memory 40, also referred to as the graphics memory 40, has a cell or memory location for each pixel.

As is conventional, the digital bit plane is constructed of logic one or logic zero elements. In the preferred embodiment of the invention and system, logic one signals will provide a green color indication on the screen 19 of the TV monitor 12 if entered into the memory 40 of the device. Logic zero will have no effect on the display 11 and if a logic zero is entered into a memory location that previously held a logic one, the "mark" on the screen 19 will be "erased". It should be understood that the logic levels of the signal can be reversed and that variations in color combinations can be achieved without departing from the spirit of the invention. As well, it should be understood that memory 40 could be composed of conventional circuitry which would allow storage and manipulation of more pixels (picture elements) thereby providing better overlay resolution.

Figure 2B:
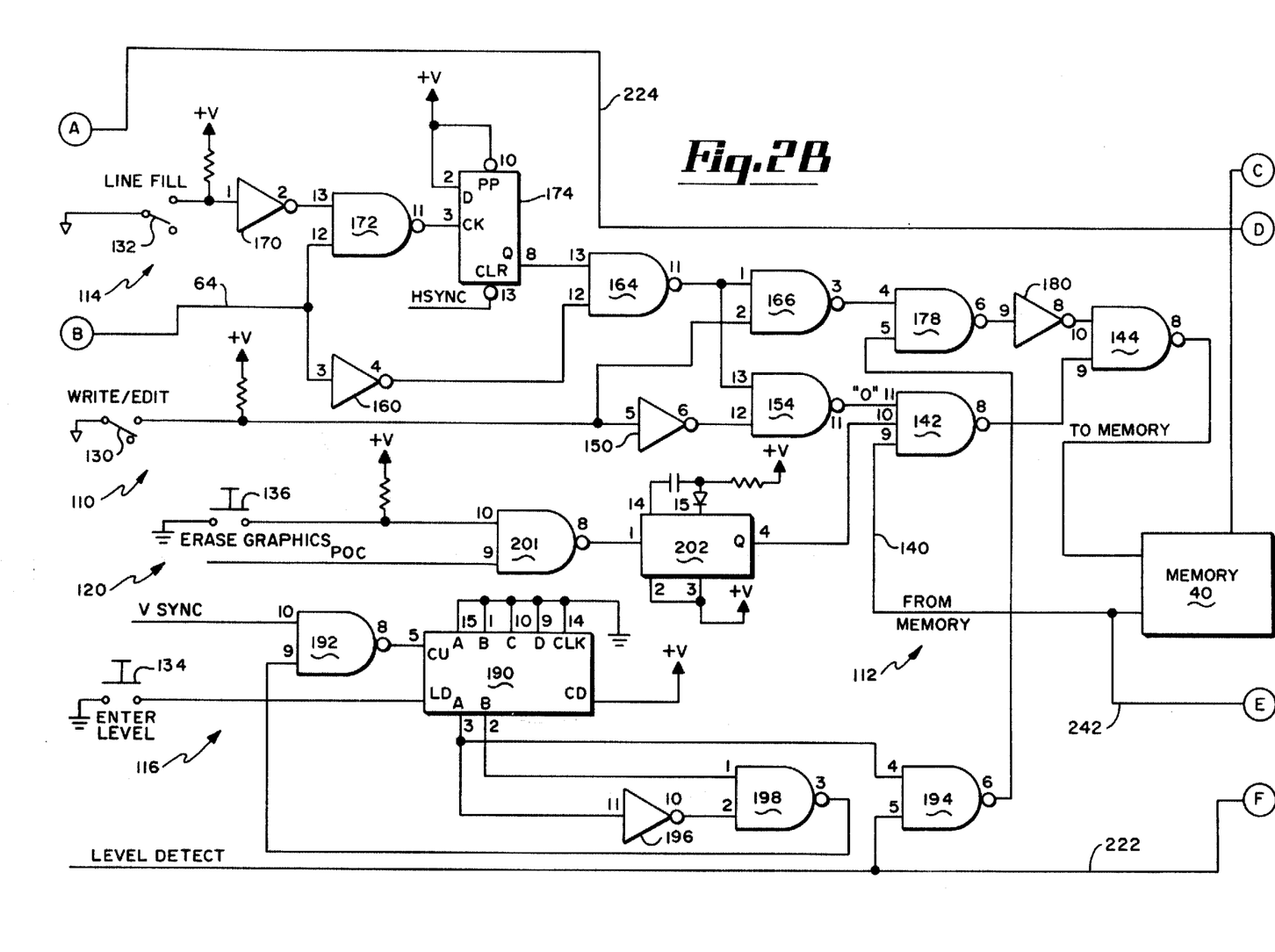

FIG. 2b shows in schematic form the various means to enter information into memory 40 for display on the monitor 12 which include means 110 to write or erase data one pixel or memory location at a time; means 112 to re-enter during each scan all data displayed on the screen 19 which was received from memory 40; means 114 to fill each horizontal scan line after it is "marked" by the pen 16 or pencil 18; means 116 to mark those portions of the screen which correspond to a particular gray level or range during one frame and enter that into memory 40; and means 120 to erase all graphics on the screen 19.

Four operable function switches 130, 132, 134, 136 are provided so that the operator of the system can choose the write or edit function that is desired. The "write/edit" switch 130 and "line fill" switch 132 are used cooperatively and are associated with light pen 16 and pencil 18 circuitry 52, 51 discussed above and can be used with conventional cursor controls (not shown). The "enter" switch 134 is used to enter and display a single frame of gray levels or ranges. The "erase graphics" switch 136 is used to clear all logic one levels in the memory 40 and replace them with logic zero and, thus, "erase" all graphics from the display 11.

If no change is to be made to the bit plane memory 40, as graphically displayed on the screen 19, the memory output is recycled along line 140 through NAND gate 142 and NAND gate 144 back to memory 40.

To write a specific bit or pixel with the light pen 16 or any area desired with the light pencil 18 the write/edit switch 30 is open which connects a high or true signal to an inverter 150 connected to NAND gate 154, the high output from which is connected to NAND gate 142. The low output from NAND gate 142 is connected to NAND gate 144 to produce a high output which is connected to the memory 40 and entered into memory 40 in synchronization with movement of the writing implement 16 or 18 as detected by the video camera 24 or from the video monitor screen 19. The pen 16 or pencil 18 input from the circuitry 62 discussed above is connected through an inverter 160 to enable or disable a NAND gate 164, also responsive to the Line Fill Switch 132 to be discussed below, the output of which is connected to a NAND gate 166 to pass the write/edit function to memory 40 if the output of the pen or pencil circuitry 51, 52 is true indicating that the operator is drawing with it. Conversely, closing the write/edit switch 130 will cause the low signal to be inverted and through the same circuit path 150, 154, 142, 155, a low signal will cause the output of NAND gate 144 to be low to "erase" or write a zero in the particular bit or pixel memory locations which are indicated by the light pen 16 or light pencil 18.

The normally open line fill switch 132 when closed is connected through an inverter 170 to a NAND gate 172. The NAND gate 172 when enabled by the pen 16 or pencil 18 signal clocks a flip-flop 174 to provide a not Q signal output, on pin 8, until the flip-flop 174 is cleared by a horizontal sync signal indicating that the next line of data is being scanned and entered. The output from the flip-flop 174 when coupled with the true pen 16 or pencil 18 signal which is inverted with an inverter 160 is connected through NAND gates 166 and 178, and inverter 180 to provide a high logic level enable to NAND gate 144 to memory 40 which fills all memory locations of the selected line after the hit with logic level one or zero depending on the output of NAND gate 142 which is determined by the position of the write/edit switch 130.

Therefore, using the combination of Line Fill and Write Edit functions an area to be measured can be rapidly delineated and filled with logic one entries for subsequent counting and calculation. Using the "write" function and Line Fill functions the left edge of the area on the CRT screen 19 can be lined with the light pen 16 or light pencil 18. This will fill the area (and corresponding memory 40 locations) to the right margin of the display 11. Switching the write/edit switch 130 to the Edit Function and keeping the "Line Fill" function enabled will permit the operator to "mark" the right edge of the area to erase data entries from the right edge of the area to the right margin of the display 11. The resulting display 11, and the contents of the graphic memory 40, will accurately indicate the exact number of pixels in the area to be measured.

To obtain marking of the display 11 from a particular gray level or range of gray levels, two controls are provided, one manual and one electronic. Since gray levels can be detected from the video cassette 14, a moving picture, the gray level detection and marking circuit cannot be continuously active or the marking would continue across or down the screen 19 as the display 11 changed. Consequently, a first manual control 134 is provided to enter the particular scene that is desired. This enables a three place counter 190.

On receipt of the first vertical sync signal after the enter switch 134 has been depressed a NAND gate 192 is enabled to begin the count. The count is incremented to binary one (01), on the first vertical sync pulse. This enables a NAND gate 194 to pass through to memory the level detect information. The level detect input is connected to the other input of the NAND gate and the signal comprises the output of a comparator (not shown) which passes only those signals in the range desired. Since this information was simultaneously and contemporaneously displayed on the screen through the interrupt connection, to be discussed below, the same information can now be recycled through memory 40 to maintain the electronic marking on the display 11. When the next vertical sync pulse occurs, the counter is incremented to binary two (or 10) which through inverter 196 and NAND gate 198 disables NAND gate 192 from passing any additional vertical sync signals and further disables NAND gate 194 from passing any additional level detect signals to the memory 40. Consequently, a single frame of data is analyzed and entered into memory 40 and that data will continue to be marked on the display 11 until another enter command clears the counter 190 to receive another single frame of data.

If the particular bit plane is going to be erased, the "erase graphics" switch 136 is closed which, with NAND gate 201, provides a high signal to a one-shot multivibrator 202, the not-Q output of which is connected to a NAND gate 142. The true output from the NAND gate 142 is connected to NAND gate 144 the other input of which is also high since neither the pen 16 nor the pencil 18 are enabled. Consequently, a low output is transmitted to each memory location during the time period set for the multivibrator 202 which is nominally set to erase at least one entire scan.

Figure 2C:
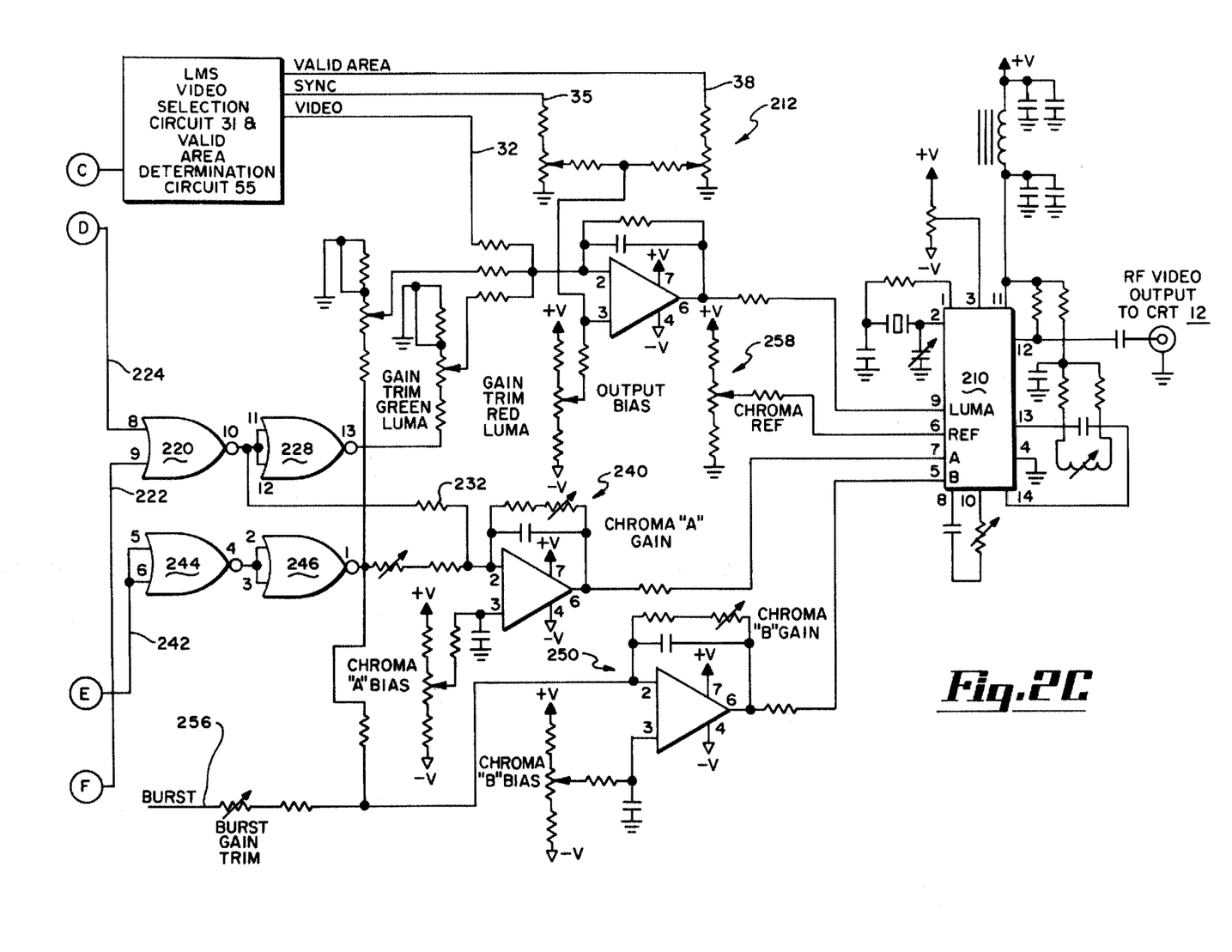

Referring now to FIG. 2c, display of the digital bit plane overlay over the analog video signal can now be discussed and understood. The matrix 210 used to produce the video input to the CRT is a conventional chip manufactured by Motorola Corporation, Manufacturer's Designation MC 1372P. Design of the inputs to the chip 210 are derived from the drive signals specified for the chip 210 by the Motorola Corporation. The analog video signal is passed to the CRT screen 19 through the luminous port, pin 9, in black and white. Input to the analog video portion 212 of the circuit includes the sync signals modified by the extended blanking pulses generated by the valid area determination circuitry 55 which assures that the entire display 11 will be synchronized with the video input from the cassette 14 or camera 24 or both 14, 24, and the digital bit plane overlay.

Inputs to the chrominance ports, pins 5, 7, are digital inputs, the logic level interrupt from NOR gate 80 and the logic level output from the memory 40, which mark the display in color in accordance with the implement used and function chosen for electronic marking. An input NOR gate 220 is used having two inputs 222, 224 shown, the gray level detection interrupt input 222 and the light pen 16 or light pencil 18 interrupt input 224, each of which allows the display 11 to be marked immediately and contemporaneously as action is being taken to create the input which may be subsequently displayed from memory 40. Cursor control circuitry (not shown) can also be conveniently added to NOR gate 220 as an interrupt. As the address of the cursor display is generated it can interrupt the monitor display 11 and be stored in memory 40 by address and therefore mark the display 11 in the same manner as the gray level detection circuitry 50 or the light pen or light pencil circuitry 52, 51.

The output of the input NOR gate 220 is connected to a second NOR gate 228 to interrupt the video input 212 and is further connected through a resistor 232 to the chroma A input circuit 240 which is connected to the chroma A input port, pin 7. In this manner the display 11 will be marked in red on a real time basis as action is being taken by the operator of the system with which the invention is practiced. Subsequent scans will display the same information if stored in the graphics memory 40.

The information stored in memory 40 is entered through a pair of serially connected NOR gates 244, 246 to the chroma A input circuit 240 and the chroma B input circuit 250 so that information stored in memory 40 is displayed in green. A color sync signal 256 is also conventionally provided on input line 256 as well as a reference input 258 to the reference port pin 6 of the matrix chip 210 as specified by its specification sheet.

In the manner described, the video display is precisely synchronized with the digital bit plane overlay and the display can be electronically marked by gray level; with a light pen 16 from the monitor 12 screen 19 to obtain areas displayed from the video cassette 14; from the display table 18 through the video camera 24 with the light pencil 18, which can also be manipulated by hand while the operator is viewing the video display 11 from the cassette 14; and through cursor controls of conventional design. The invention provides an extremely flexible electronic marking system which is extremely inexpensive to construct and similarly inexpensive to maintain.

The foregoing specification sets forth certain preferred embodiments and modifications of the invention and some of the ways in which the invention may be put into practice, including the best mode presently contemplated by the inventor for carrying out this invention. Modification of the described embodiment, as well as alternate embodiments and devices for carrying out the invention, will also be apparent to those skilled in the art. For example, many of the functions can be performed by equivalent software routines and different specific elements can be substituted such as replacing the three multivibrators 64, 66, 68, in the light pen circuit 52 with two so that the first multivibrator would be set to retrigger at a time slightly longer than the period of one horizontal line of the Raster scan on the monitor. This signal would be processed by associated circuitry which would allow an admit-one-pulse-circuit to be enabled. A second multivibrator would trigger at the same time as the first multivibrator triggered but would not retrigger. The output of the second multivibrator would have a period of one or more horizontal line scan periods, minus the propagation delay of the light pen raw interrupt signal and the propagation delay of the second multivibrator. Upon the trailing edge of this second multivibrator, one pulse would be issued through the associated equipment or through the admit-one-pulse logic circuitry. All such modifications are intended to be within the spirit and scope of the following claims.

I claim:

1. Write and edit circuitry for electronic marking of electronically displayed video images comprising
    video image generating means for generating at least one video image signal to be displayed;
    electronic marking means for providing a logic level signal to be displayed;
    video overlay means connected to the electronic marking means for generating a digital bit plane overlay signal to be displayed which is synchronized with the video image signal comprising;
        memory means for selectively storing the logic level signals as data bits for the digital bit plane overlay signal; and
    display means connected to the video image generating means, the electronic marking means and the video overlay means comprising;
        means for displaying the video image;
        means for displaying the logic level signals as they they are generated; and
        means for displaying the data bits stored in the memory means;
    wherein the logic level signals generated by the marking means are displayed during the same scan that the logic level signals are generated and are displayed in subsequent scans if stored as data bits in the memory means.

2. The write and edit circuitry of claim 1 wherein the video image generating means generates a raster scan video input signal.

3. The write and edit circuitry of claim 1 wherein the video image generating means comprises
    a video cassette recorder capable of displaying on the display means video images previously obtained and stored on a video cassette.

4. The write and edit circuitry of claim 1 wherein the video image generating means comprises
    a video camera for displaying on the display means the image sensed by the video camera.

5. The write and edit circuitry of claim 1 wherein the video image generating means comprises a video cassette recorder; and
a video camera; and
wherein the write and edit circuitry further comprises;
   a video display selection circuit for selectively displaying on the display means either the video image generated by the video cassette recorder or the video image generated by the video camera or both.

6. The write and edit circuitry of claim 1 wherein the electronic marking means comprises a light pen.

7. The write and edit circuitry of claim 1 wherein the electronic marking means comprises a light pencil.

8. The write and edit circuitry of claim 1 wherein the electronic marking means comprises cursor controls.

9. The write and edit circuitry of claim 1 wherein the electronic marking means comprises gray level detection circuitry for selectively detecting any one of a plurality of gray levels in the video image signal.

10. The write and edit circuitry of claim 2 wherein the electronic marking means comprises a light pen for detecting a plurality of light hits from the display means and
   means for displaying on the display means only the first light hit detected by the light pen.

11. The write and edit circuitry of claim 10 wherein the means for displaying the first light hit detected by the light pen comprises at least two multivibrators to create a single pulse to be displayed on the display means.

12. The write and edit circuitry of claim 10 wherein the means for displaying only the first light hit detected by the light pen comprises
   means for inhibiting all but the first light hit detected by the light pen;
   means for delaying the display of the light hit detected by the light pen until the next raster scan line; and
   means for adjustably displaying the light hit along a selected portion of the second scan line.

13. The write and edit circuitry of claim 12 wherein the means for displaying the first light hit detected by the light pen comprises a plurality of multivibrators wherein
   the first multivibrator inhibits the detection of any additional light hits for at least ten scan lines; and
   the second multivibrator delays the display of the detected light hit for one horizontal scan line less the propagation delay of the circuitry; and
   wherein the third multivibrator controls the time duration of the logic level signal to be displayed one horizontal scan line later.

14. The write and edit circuitry of claim 7 wherein the video image generating means comprises a video camera and
   wherein the electronic marking means comprises means which can be selectively positioned within the image detected by the video camera having at least one surface which is the brightest area within the image detected by the light camera.

15. The write and edit circuitry of claim 14 wherein the bright area comprises a light color paint on the surface of the light pencil.

16. The write and edit circuitry of claim 14 wherein the light pencil comprises at least one light source.

17. The write and edit circuitry of claim 16 wherein the light source comprises at least one LED.

18. The write and edit circuitry of claim 16 wherein the light source comprises at least two LEDs which can be selectively energized so that a small image or a large image may be selectively displayed by the display means.

19. The write and edit circuitry of claim 7 wherein the video image generating means comprises
   a video camera; and
   wherein the electronic marking means comprises a light pencil level detect circuit associated with the video camera comprising;
      a level detect circuit for detecting the brightest area within the image detected by the video camera.

20. The write and edit circuitry of claim 19 wherein the light pencil level detect circuit further comprises means for adjusting the sensitivity of the comparator means so that only the brightest area is detected and displayed on the display means.

21. The write and edit circuitry of claim 1 wherein the video overlay means further comprises
   means to reenter into the memory means all data bits previously stored in the memory means and displayed on the display means.

22. The write and edit circuitry of claim 1 wherein the video overlay means further comprises
   means to enter into or delete from the memory means data bits which are marked by the electronic marking means, one data bit at a time.

23. The write and edit circuitry of claim 1 wherein the video overlay means further comprises
   means to enter data bits into the memory means which correspond to portions of horizontal scan lines displayed by the display means and marked by the electronic marking means.

24. The write and edit circuitry of claim 2 wherein the video overlay means further comprises
   means to enter into the memory means data bits which correspond to a particular gray level during a single scanning frame of the display means.

25. The write and edit circuitry of claim 1 wherein the video overlay means further comprises
   means for removing all data bits from the memory means.

26. The write and edit circuitry of claim 2 wherein the video overlay means further comprises
   means for removing data bits from the memory means one scan line at a time.

27. The write and edit circuitry of claim 1 wherein the display means comprises
   a color television monitor having a luma port and at least two chroma ports; and
   wherein the means for displaying the video image comprises;
   means for connecting the video image signal to the luma port to be displayed in black and white; and
   wherein the logic level signal and the memory means are connected to the chroma ports so that the logic level signal is displayed in a first color and the data bits from the memory means are displayed in a second color.

28. The write and edit circuitry of claim 27 wherein the logic level signals interrupt the video signal and are displayed in red and wherein the data bits from the memory means are displayed in green.

29. The write and edit circuitry of claim 1 wherein the video image generating means, the electronic marking means, the video overlay means and the display means are all synchronized with each other.

30. The write and edit circuitry of claim 1 wherein the video image generating means comprises a video cassette recorder and wherein the video cassette recorder generates synchronization signals which are connected to the electronic marking means, the video overlay means and the display means so that each operates in synchronization with the other.

31. The write and edit circuitry of claim 30 wherein the video image generating means further comprises a video camera and wherein the synchronization signals are connected to the video camera so that the video image signal generated by the video camera is synchronized with the video image signal generated by the video cassette recorder and the electronic marking means, the video overlay means and the display means.

32. The write and edit circuitry of claim 1 wherein the display means comprises a television monitor having a CRT screen; and further comprising valid area determination means connected to the display means for limiting the display to the most linear portion of the CRT screen.

33. The write and edit circuitry of claim 2 wherein the video overlay means further comprises function means for selectively entering logic level signals as data bits into the memory means according to a selected function.

34. The write and edit circuitry of claim 33 wherein the function means comprise means to reenter into the memory means all data bits previously stored in the memory means and displayed on the display means;

means to enter into or delete from the memory means data bits which are marked by the electronic marking means one data bit at a time;

means to enter into or delete from the memory means data bits which correspond to portions of horizontal scan lines displayed by the display means and marked by the electronic marking means;

means to enter into the memory means data bits which correspond to a particular gray level during a single scanning frame of the display means;

means for removing all data bits from the memory means; and wherein the display means comprises a color television monitor having a luma port and at least two chroma ports wherein the video image signal is connected to the luma port to be displayed in black and white and wherein the logic level signal and the memory means are connected to the chroma ports so that the logic level signal is displayed in a first color and the data bits from the memory means are displayed in a second color.

* * * * *